United States Patent Office 2,785,579
Patented Mar. 19, 1957

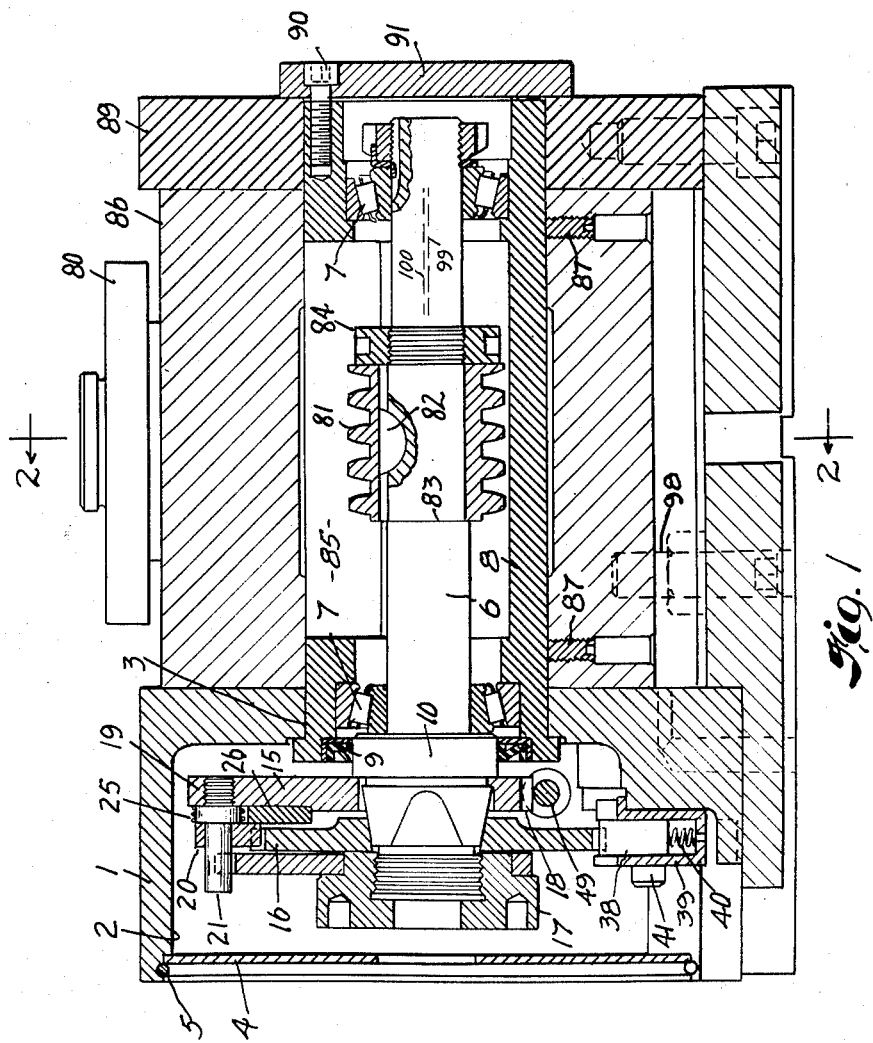

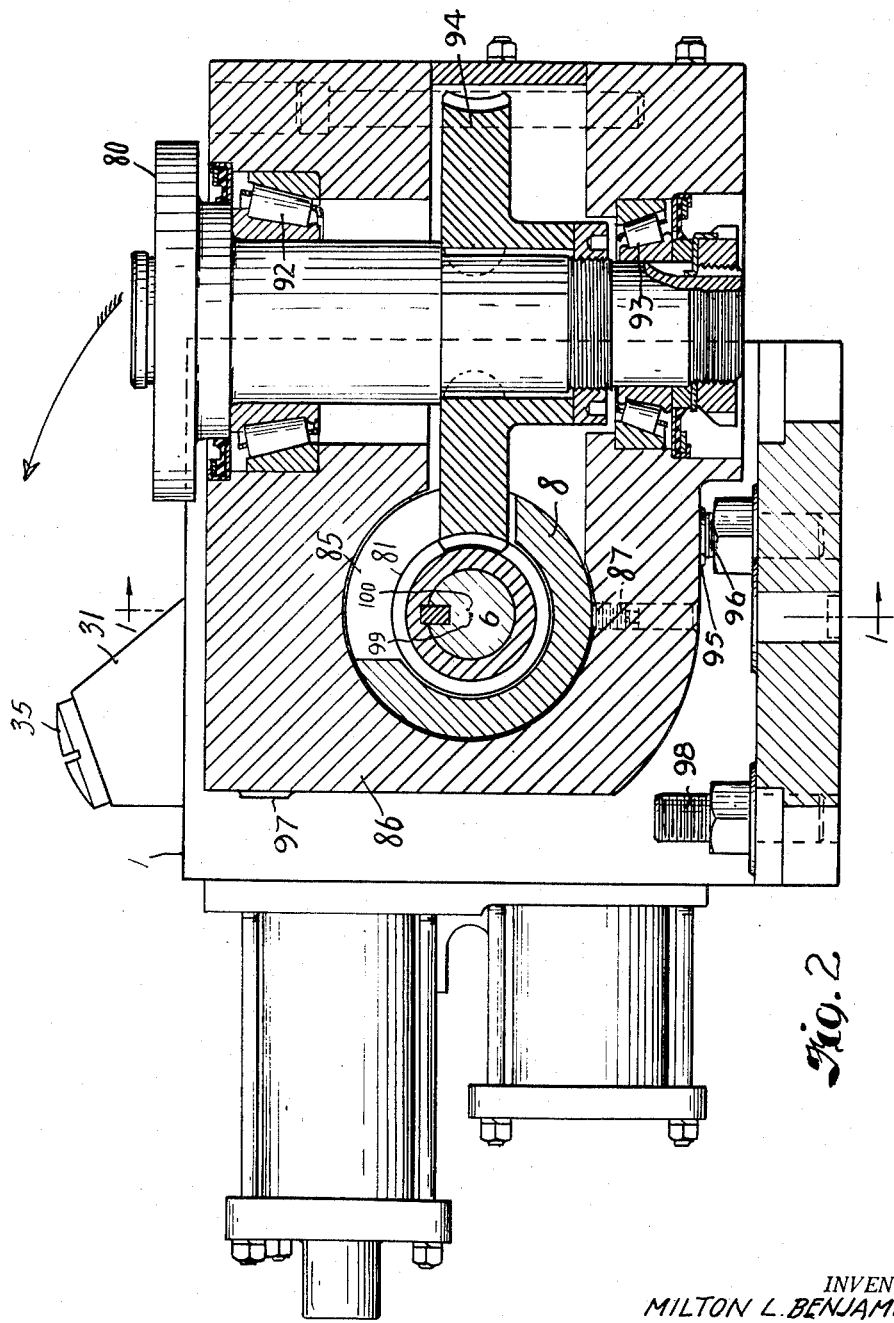

2,785,579

ADJUSTABLE GEARING

Milton L. Benjamin and Franklyn E. Winnen, Cleveland, Ohio, assignors, by direct and mesne assignments, to Erickson Tool Company, a corporation of Ohio Application December 13, 1954, Serial No. 474,671

1 Claim. (Cl. 74—396)

The present invention relates generally as indicated to an index fixture, and more particularly to an index fixture having an indexing plate which is capable of being indexed over a relatively wide range of increments adjustable from $\frac{1}{40}$ to $\frac{1}{500}$ of a revolution, for example.

Hitherto, indexing for milling machines and the like has been a fairly complicated procedure. Even in the case of so-called "simple indexing" the operator must divide the number of turns of the index crank to produce one revolution of the dividing head spindle by the number of divisions required; and for compound indexing and differential indexing, lengthy charts are generally provided which give the indexing movements corresponding to predetermined divisions and include the various combinations of gears and idlers to produce different divisions, usually ranging from say 2 to 364.

It is a general object of this invention to provide an index fixture which is of extremely simple and compact structure and which, by the use of relatively few master plates, is able to cover the entire wide range of say 40 to 500.

It is another object of this invention to provide an index fixture in which the axis of the indexing spindle may be vertical, horizontal, or any angle therebetween for use as in connection with milling machines of the vertical and horizontal types. In the case of the horizontal type milling machine, the index fixture herein, by appropriate adjustment of its indexing spindle, may be mounted either to the left or to the right of the milling machine spindle.

It is another object of this invention to provide a self-locking worm drive for the indexing spindle, said worm drive being driven by a simple indexing unit capable of mounting interchangeable notched plates or ratchet wheels which are indexed according to the spaces between the notches thereof or multiples thereof to correspondingly move the indexing spindle an amount divided by the worm drive ratio.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawings setting forth in detail a certain illustrative embodiment of the invention, this being indicative, however, of but one of a few of the various ways in which the principle of the invention may be employed.

In said annexed drawings:

Fig. 1 is a vertical cross-section view taken substantially along the line 1—1, Fig. 2; and Fig. 2 is a cross-section view taken substantially along the line 2—2, Fig. 1.

Referring now more particularly to the drawings, the index fixture herein is, in general, quite similar to that disclosed in our Patent No. 2,600,960, granted June 17, 1952, and more particularly to the index fixture disclosed in the Milton L. Benjamin application Serial No. 412,491, filed February 25, 1954.

Thus, the index fixture includes a housing 1 which is formed with a recess 2 and a bore 3 which leads into such recess, and the recess in turn is closed as by means of a cover plate 4 which is fitted into the open end of said recess and is held in place therein as by means of a snap ring 5.

A spindle 6 is journalled in tapered roller bearings 7, the outer races of which bearings are in turn fixed within a tubular member 8 which projects forwardly through the bore 3, there being a suitable packing 9 between said tubular member 8 and an enlarged collar portion 10 on said spindle 6. The construction of the forward portion of the present index fixture will be described in greater detail after the description of the basic indexing mechanism per se.

The rear end of spindle 6 extends into the recess 2 as shown and is formed with a bearing surface thereon on which a pawl support member 15 is rotatable. Adjacent said pawl support member 15 and non-rotatable on said spindle is a ratchet wheel 16, said pawl support member and said ratchet wheel being axially retained on said spindle by means of the spindle nut 17.

As will hereinafter more fully appear, the ratchet wheel 16 and spindle 6 constitute a driven rotary indexing member, whereas the pawl support member 15 operates as a driving member. Said pawl support member 15 is formed with a gear segment 18 concentric with the axis of a rotation of said member, and a radially projecting lug 19 to which a driving pawl 20 is pivotally mounted through the intermediary of a pawl bolt 21 threaded into said lug.

The end of said pawl 20 is adapted to be engaged in one of the interdental spaces or notches in the periphery of said ratchet wheel 16 and is formed so as to click over the ratchet wheel notches in the counter-clockwise direction of movement of said pawl 20 and its support member 15 as viewed from the left hand side of Fig. 1. A torsion spring 25 around the bolt 21 has its opposite axially directed ends fitting into holes in the pawl 20 and lug 19 respectively and is operative to rotate the pawl end inwardly to engage in a ratchet wheel notch.

Bolted to the pawl support member 15 is an arcuate cam plate 26 which is formed with a cam surface engageable with the inner end of a locking plunger or lock member (not shown) which is radially reciprocably mounted in the boss 31 of housing 1.

Said plunger is urged radially inward as by means of a compression spring which is interposed between said plunger and a cap 35 threaded into the outer end of said boss 31.

In order to hold the ratchet wheel 16 against rotation during the counter-clockwise rotation of the pawl support member 15, there is provided a spring-actuated holding pawl 38 radially slidably supported in a block 39, said pawl being urged into engagement with the ratchet wheel 16 as by means of the compression spring 40.

Oscillation of said pawl support member 15 in opposite directions is effected by reciprocation of the movable element of a fluid power device, said fluid power device as disclosed in said patent and application comprising coaxial single-acting cylinders secured on opposite sides of housing 1 and a movable element in the form of a common piston rod 49 extending therebetween and formed with annular grooves in engagement with the teeth of the gear segment 18.

With a mechanism as just described, it is possible to index the spindle 6 through $\frac{1}{24}$ of a revolution or a multiple thereof when the ratchet wheel is provided with twenty-four teeth or notches. Similarly, when a 20-tooth ratchet wheel is used, the spindle 6 will be indexed $\frac{1}{20}$ of a revolution or a multiple thereof. Likewise, when an 18-tooth ratchet wheel is used, the spindle 6 will be indexed through 1/18 of a revolution or a multiple thereof. Thus, with relatively few ratchet wheels, a wide variety of indexing movements may be accurately achieved.

Thus, taking the three examples given, the spindle 6 may be indexed 1/24, 1/20, 1/18, 1/12, 1/10, 1/9, 1/8, 3/20, 1/6, etc. part of a revolution for each stroke, and such indexing will be extremely accurate, since the locking plunger is effective to securely hold the spindle 6 in its indexed position and the tapered interfitting square portions of the ratchet wheel and spindle eliminate rotary looseness therebetween.

Having thus described the mechanism for indexing the spindle 6, and which mechanism is disclosed in a general way in the patent aforesaid and specifically in the copending application aforesaid, reference will now be made to the balance of this invention wherein the indexing movement of the spindle 6 divided by 20 or some such division, so that a work-supporting plate or indexing spindle 80 may be indexed through very small divisions ranging say from 1/40 to 1/500 of a revolution and at relatively close increments therebetween even when the ratchet wheels 16 employed are relatively few in number.

Mounted intermediate the ends of the spindle 6 is a worm 81 which is keyed onto said spindle by means of the key 82 and which is held tightly against the shoulder 83 of the spindle 6 as by means of the nut 84 threaded onto said spindle. Since in this particular case the worm 81 is of larger diameter than the forward end of the sleeve part 8, the latter is formed with a cut-away section 85 through which said worm 81 and nut 84 may be laterally inserted, followed by insertion of the spindle 6 into the tubular member 8 and through the tapered roller bearings 7.

Mounted on the tubular member 8 is a block 86 held in place thereon as by means of set screws 87. The opposite ends of said block are flat and parallel and are respectively juxtaposed to the front end face of the housing 1 and the rear end face of an upright 89. When said block 86 is in the desired position, the tightening of the screws 90 at the front end of the tubular member 8 will draw the plate 91 against the upright 89 and, in turn, the block 86 will be tightly clamped between the housing 1 and said upright 89.

Said block 86 has journalled therein the spindle 80, and preferably tapered roller bearings 92 and 93 are employed so that axial and radial looseness of said spindle 80 is eliminated. A chuck or the like, not shown, is adapted to be mounted on the flange of said spindle 80 so that a work piece may be clamped thereto for desired indexing movement when operated upon by the tool of a milling machine or the like.

Keyed on said spindle 80 is a worm wheel 94, the periphery of which extends through the aforesaid opening 85 in the tubular member 8 and meshes with the worm 81, whereby the indexing of the spindle 6 effects indexing of the spindle 80 but by an amount dependent on the ratio of the worm gear drive.

Thus, if, for example, an 18-tooth ratchet wheel 16 is used and the worm drive has a 20:1 ratio, each 1/18 of a revolution of the spindle 6 will cause a 1° or 1/360 of a revolution of the spindle 80 and the work mounted thereon.

In Fig. 2, the block 86 is shown in a position with the spindle extending vertically upward, a boss 95 on said block engaging a stop screw 96 on the base of the fixture. Should it be desired to position the spindle 80 in horizontal position, all that it is necessary to do is to loosen the screws 90 and to swing said block 86 until the boss 97 engages the stop screw 98.

In the arrangement shown in Fig. 2, the spindle 80 would extend toward the lefthand side when the block 86 is swung, and if it were desired to have the spindle at the righthand side, the set screws 87 would be loosened and the block 86 slipped off from the tubular member 8 and reversed end for end. Then, the block 86 could be swung so that the spindle 80 is vertical or horizontal toward the right.

From the foregoing, it can be seen that the present invention provides a simple and accurate indexing mechanism, which, with relatively few master plates or ratchet wheels 16, it is possible to obtain a large number of fine and accurate indexing divisions.

As a further distinctive feature of the present invention, and as clearly shown in Figs. 1 and 2 (much exaggerated), the axis 100 of the spindle 6 is eccentric with respect to the axis 99 of the outside diameter of the sleeve 8 so that, upon clockwise rotation of said sleeve 8 as viewed in Fig. 2, the worm 81 will thereby be urged closer to the worm wheel 94 to eliminate backlash.

In actual practice, such eccentricity between the axes 99 and 100 will be, say, 1/32", and the worm wheel 94 and worm 81 will be run together tightly with the axes disposed as shown in Fig. 2, that is, at a 45° angle with respect to a plane passing through the axis 99 and the median plane perpendicular to the axis of the worm wheel 94.

Thus, when the index fixture is assembled, the axes 99 and 100 will be disposed as shown; and, as the worm or worm wheel teeth wear, the sleeve may be rotated clockwise until the backlash due to the wear is eliminated. In the particular embodiment herein, the adjustment for backlash take-up extends only through 45° of rotation of the sleeve 8 but, obviously, if a greater amount of take-up is desired, the eccentric axes may be located so as to provide as much as 180° of adjustment, which is twice the eccentricity.

Other modes of applying the principle of the invention may be employed, change being made as regards the details described, provided the features stated in the following claim, or the equivalent of such, be employed.

We therefore particularly point out and distinctly claim as our invention:

In an index fixture, the combination of a first housing including parallel members relatively movable toward each other; a tubular member extending transversely between said members and having means thereon for drawing said parallel members relatively toward each other; a first spindle journalled in said tubular member; an indexing mechanism in said housing operatively connected to said first spindle to rotatably index the same; a second housing journalled on said tubular member and adapted to be clamped between said parallel members in a desired adjusted rotary position relative to said first housing; a second spindle journalled in said second housing; and drive means interconnecting said spindles for indexing of said second spindle by said first spindle; said drive means comprising an intermeshing worm and worm wheel respectively keyed on said first and second spindles and arranged to intermesh irrespective of the rotary adjusted position of said second housing; said tubular member being formed with a lateral opening through which said drive means extends.

References Cited in the file of this patent

UNITED STATES PATENTS

| | | |
|---|---|---|
| 772,894 | LeBlond et al. | Oct. 18, 1904 |
| 1,312,277 | Shields et al. | Aug. 5, 1919 |
| 2,059,753 | Scott | Nov. 3, 1936 |
| 2,528,753 | Jessup | Nov. 7, 1950 |
| 2,570,444 | Henkel | Oct. 9, 1951 |